M. A. DROITCOUR.
SHAFT LOCKING MEANS.
APPLICATION FILED NOV. 14, 1914.
1,163,898.
Patented Dec. 14, 1915.
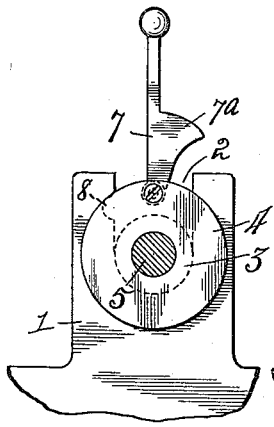
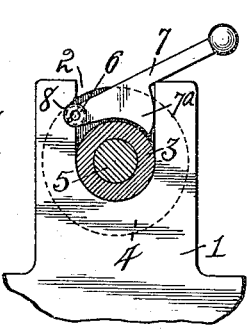
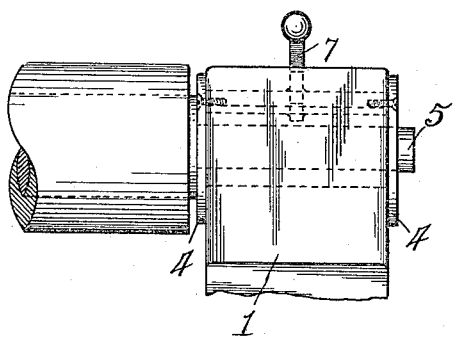
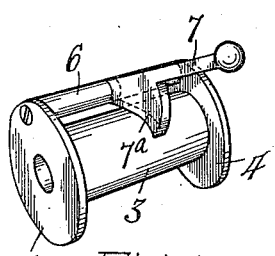
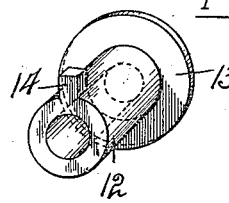
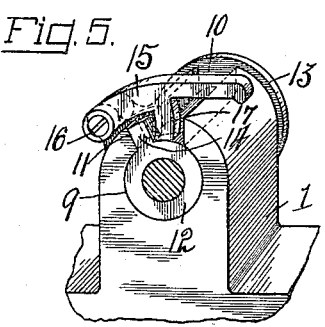
WITNESSES:—
INVENTOR.
Michael A. Droitcour,
By Owen, Owen & Crampton,
attys.

UNITED STATES PATENT OFFICE.

MICHAEL A. DROITCOUR, OF DELPHOS, OHIO.

SHAFT-LOCKING MEANS.

1,163,898.  Specification of Letters Patent.  Patented Dec. 14, 1915.

Application filed November 14, 1914. Serial No. 872,163.

*To all whom it may concern:*

Be it known that I, MICHAEL A. DROITCOUR, a citizen of the United States, and a resident of Delphos, in the county of Van Wert and State of Ohio, have invented a certain new and useful Shaft-Locking Means; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to roll locking means for use in connection with the inking rolls of printing presses.

The object of my invention is the provision, particularly in connection with the removable inking rolls of printing presses, of means which is simple and efficient in its construction and easily and quickly operable to securely lock a roll in operative position or to release the same to permit a removal thereof from the press.

The invention is fully described in the following specification, and while, in its broader aspect, it is capable of embodiment in numerous forms, a preferred and one modified form thereof are illustrated in the accompanying drawings, in which,—

Figure 1 is an end elevation of a device embodying the preferred form of the invention in released relation to its bearing. Fig. 2 is a similar view thereof in locked position with a part in section. Fig. 3 is a side elevation of a roll and bearing with my invention associated therewith and in locked position. Fig. 4 is a perspective view of the removable bushing part of the device and locking member attached thereto. Fig. 5 is a perspective view of a modified form of the invention in locked relation to a bearing, and Fig. 6 is a perspective view of the removable bushing member removed from the bearing.

Referring to the drawings, 1 designates a part of a press frame or other stationary member, which part is provided in the upper end thereof with an incut or notch 2 forming a bearing opening for a shaft receiving bushing 3. The bushing 3 is capable of being easily dropped into the recess 2 or removed therefrom, and in order to prevent endwise movement of the bushing within the bearing, it is provided at its ends with flanges 4 for coaction with the sides of the part 1 at the ends of the recess 2, as best shown in Fig. 3. The bushing 3 has an opening axially therethrough of suitable size to receive an end of a roller shaft 5 for free turning movements therein.

Disposed between and pivotally carried at its ends by the flanges 4 of the bushing, in parallelism with its shaft receiving opening, is a shaft 6, which has a locking lever 7 projecting transversely therefrom and adapted, in the present instance, to have rocking movements therewith. The shaft 6 is disposed at the top of the bushing when inserted into a bearing recess 2, and the bushing is then turned in one direction to place the shaft 6 within a registering notch 8 that is provided in one wall of the recess 2. When the shaft is in engagement with the notch 8, the lever 7 is swung down to force a protuberant cam portion 7ª thereof down into the recess 2 in coaction with the wall thereof opposed to the recess 8, thus causing the protuberant part 7ª to coact with the respective wall of the recess 2 to lock the shaft 6 in interlocking engagement with the recess 8.

It is evident that the coaction of the recess 2 effects a secure locking of the bushing 3 within the recess. It is also evident that such locking action is easily accomplished, as it is only necessary to impart a swinging movement to the lever 7 in conjunction with a slight turning movement of the bushing 3.

In the modified form of the invention shown in Figs. 5 and 6, the frame part 1 has its bearing or bushing receiving opening 9 closed at the upper end thereof, except for a restricted opening 10, one wall of which at the outer end thereof is provided with a notch 11. The shaft carrying bushing, which is designated 12, is provided with a flange 13 at the inner end only thereof to enable the bushing to be slipped endwise into the bearing opening 9. Projected radially from the end of the bushing opposed to that carrying the flange 13 is a lug 14 which traverses the restricted opening 10 when the bushing is being inserted into or withdrawn from the bearing opening 9. When the bushing has been inserted to its full extent into the bearing opening 9 the lug 14 registers with and is movable into the notch 11 by a slight turning of the bushing, thus preventing a withdrawal of the bushing from the bearing opening until the bushing has been turned back to place the lug in register with the opening 10. A locking lever 15 is pivoted to the upper end portion of the bearing part 1 at one side of the opening 10, as at 16, and is provided with a tooth 17 in position to be projected into the opening 10 in register with the notch 11 when the lever is swung down over the bearing part 1, thus preventing a withdrawal of the bushing lug 14 from the notch 11 until the lever has been raised for such purpose.

It is evident that I have provided simple and efficient means for locking a roller in operative position, and which may be easily and quickly operated to release the roll to permit a removal of the same from its supporting bearings.

I wish it understood that my invention is not limited to any specific construction, arrangement or form of the parts except in so far as such limitations are specified in the claims.

Having thus described my invention, what I claim as new, and desire to secure by Letters Patent, is,—

1. In combination, a bearing having a bearing opening therein with one wall of such opening notched, a shaft carrying member removably mounted in said opening and having a part movable into interlocking engagement with said notch, and means for preventing a withdrawal of said part from engagement with the notch.

2. In combination, a bearing having a bearing opening therein, a shaft carrying bushing removably mounted in said opening, said bushing having a part movable into interlocking engagement with a portion of said bearing upon a turning of the bushing in one direction within the bearing, and means operable to prevent a turning of said bushing to release the interlocked engagement of said part and bearing.

3. In combination, a member having a bearing recess provided with a notch in a side wall thereof, a shaft carrying bushing journaled in said bearing recess and having a part movable into interlocking engagement with said notch, and a lever operable to lock said part in notch engaging position or to permit a release of the same from engagement with the notch.

4. In combination, a member having a bearing recess, a shaft carrying bushing removably and rotatably mounted in said recess, a part carried by said bushing and movable by rotary movements of the bushing into and out of interlocking engagement with the wall of said recess, and a member operable to coöperate with said part to releasably lock the bushing in said recess.

5. In combination, a member having a bearing recess, a shaft carrying bushing removably mounted in said recess, and lever means carried by said bushing and movable to have coaction with opposite walls of said recess to lock the bushing within the recess.

6. In combination, a member having a bearing recess therein, a shaft carrying bushing removably mounted in said recess and having a part movable into interlocking engagement with a wall of the recess to prevent a removal of the bushing from the recess, and a lever member projecting from said part and operable in conjunction with a wall of the recess to secure said part in locking position.

7. In combination, a member having a bearing recess therein with one wall of the recess provided with a notch, a shaft carrying bushing removably mounted in said recess and having flanges for coacting with the member to prevent the bushing from having endwise movements in said recess, a part carried by said bushing and movable into interlocking engagement with said notch, and a cam lever carried by said part and movable into thrust contact with a wall of said recess to force said part into its notch.

In testimony whereof, I have hereunto signed my name to this specification in the presence of two subscribing witnesses.

MICHAEL A. DROITCOUR.

Witnesses:
 RALPH J. WEGER,
 C. J. LEIEICH.